June 5, 1928.  1,672,136
G. R. SCOTT
WINDSHIELD CLEANER
Filed May 20, 1927  2 Sheets-Sheet 1
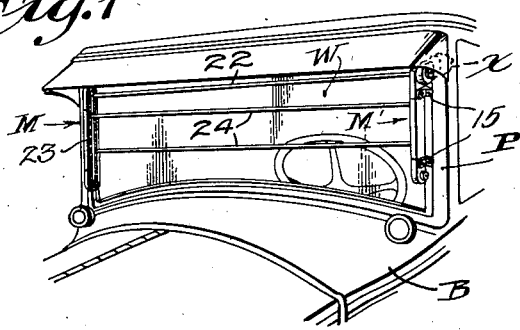
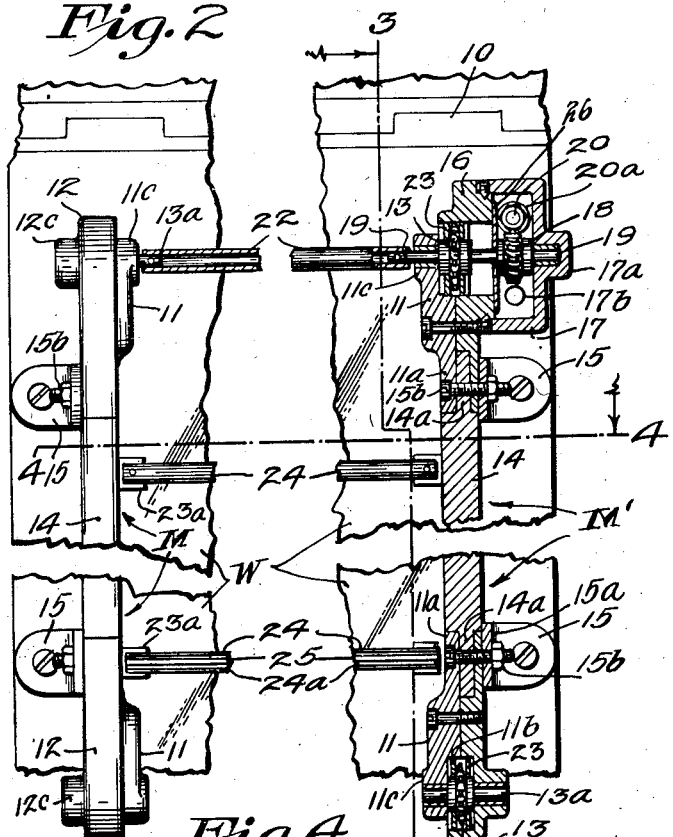
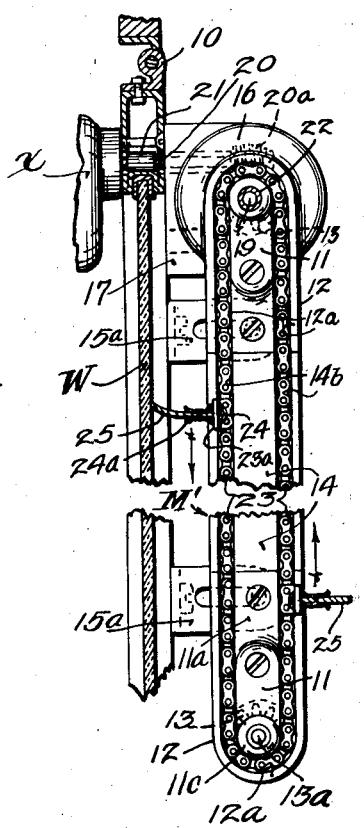
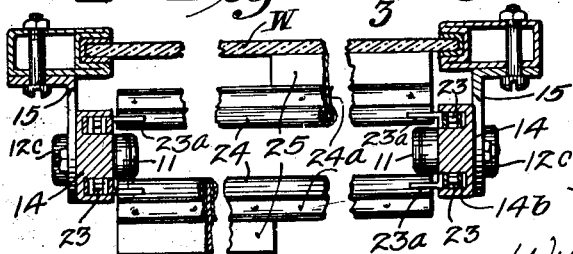
Inventor
Gus R. Scott
By his Attorneys
Williamson Reif Williamson June 5, 1928.  
G. R. SCOTT  
WINDSHIELD CLEANER  
Filed May 20, 1927  
1,672,136  
2 Sheets-Sheet 2
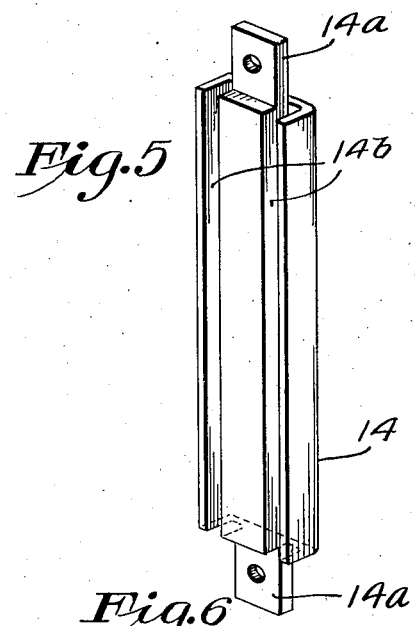
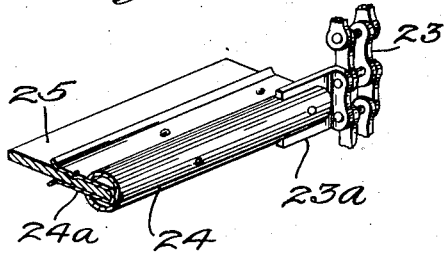
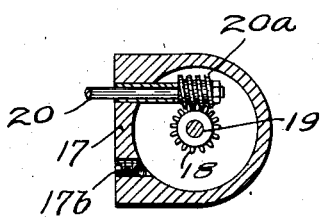
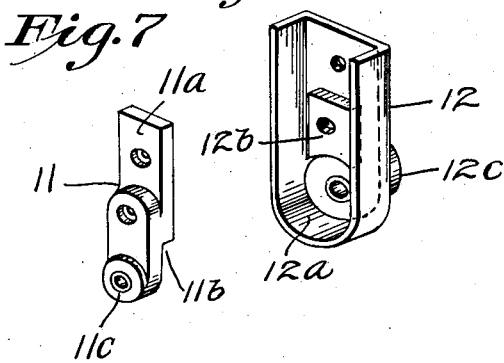
Inventor  
Gus R. Scott  
By his Attorneys  
Williamson Reif & Williamson

Patented June 5, 1928.

1,672,136

UNITED STATES PATENT OFFICE.

GUS R. SCOTT, OF MINNEAPOLIS, MINNESOTA.

WINDSHIELD CLEANER.

Application filed May 20, 1927. Serial No. 192,903.

This invention relates to wind shield cleaners and while having special applicability to wind shields for transportation vehicles, such as motor vehicles, street railway cars and locomotives, can also be used with success wherever it is desirable to keep a transparent wall clear of rain, snow and dirt.

Practically all wind shield wipers commercially used have employed either a horizontally reciprocating movement or a reverse swinging movement with the consequence that material was not permanently removed from the wind shield but merely swept to one side or to the top and a portion thereof would often be swept back over the transparent surface. In addition to the disadvantage above mentioned it is a fact that both the horizontally reciprocable and swingable wipers divert the driver's attention more than a vertically movable wiper, due to the fact that the human eyes are horizontally alined. A few wind shield wipers have been manufactured which clear the entire wind shield, but these have usually required reversing motors and necessitated the employment of only a single wiping element with a result that the wind shield could not be cleared fast enough to prevent some accumulation thereon.

It is an object of my invention to provide a comparatively simple but highly efficient wind shield cleaner which will not obstruct the vision of the occupants of a transportation vehicle to any appreciable extent and which will positively remove rain, snow and foreign material from the entire wind shield by a succession of vertical sweeps from the top to the bottom of the wind shield.

A further object of my invention is to provide a highly efficient wind shield cleaner which may be readily attached to all standard types of transportation vehicles without requiring alteration thereof, the driving connections, mountings, elements and other parts being reversible to suit various requirements.

Another object is to provide a wind shield cleaner having one or more horizontally disposed wiping elements which may traverse the entire wind shield, the wiping elements being mounted between endless chains to successively sweep the wind shield from top to bottom.

These and other objects of the invention will be apparent from the following description made in connection with the accompanying drawings, in which like reference characters refer to similar parts throughout the several views and in which:

Fig. 1 is a perspective view of the wind shield and cowl of an automobile body having an embodiment of my invention applied thereto;

Fig. 2 is a front elevation of my wind shield cleaner attached to a wind shield of the swinging type, some portions being broken away and others shown in section;

Fig. 3 is a vertical cross section taken on the line 3—3 of Fig. 2;

Fig. 4 is a horizontal section taken on the line 4—4 of Fig. 2;

Fig. 5 is a perspective view of one of my chainways detached;

Fig. 6 is a perspective view of one of the outer plates of the sprocket housing detached;

Fig. 7 is a perspective view of one of the inner plates of the sprocket housing;

Fig. 8 is a perspective view showing my means for mounting one of the wiper elements on the chains; and Fig. 9 is a cross section of the cap used in my driving head.

In the drawings, the body B of an automobile is illustrated provided with the usual vertical posts P which support the top. As illustrated, a wind shield of the swinging type is indicated as an entirety by the letter W, hinged at 10 to the forward end of the automobile top.

In a general way my invention comprises a pair of vertical mountings adapted to be readily attached to the sides of a wind shield, endless chains working in said mountings, one or more wiper elements traversing said chains and secured to oppositely disposed links thereof, and efficent means for driving said chains whereby the entire surface of the wind shield will be successively swept from top to bottom.

With the exception of the driving head which is disposed at the upper end of one of said mountings, said mountings are identical and to shorten the description thereof the several parts common to both will be numbered alike. Mounting M is provided at its upper and lower ends and mounting M' is provided at its lower end with sprocket housings, each being formed from inner and outer plates 11 and 12 respectively. Outer plates 12 are each provided with a U-shaped flange 12ª extending normal to the outer face thereof and have medially disposed on the inner faces, the spacing lugs 12^b. A suitable boss 12^c is formed in the outer portion of plate 12 constituting an outer bearing for the sprocket shaft 13^a.

Inner plate 11 is provided with a rectangular block portion 11^a adapted to be seated against spacing lug 12^b and of less width than the distance between the sides of flanges 12^a. The remainder of said plate forms an inner chain guide in co-operation with the U-shaped flange 12^a of plate 12. The inner side of the chain guide portion of plate 11 is recessed at 11^b to accommodate the chain sprocket and a boss 11^c is formed on the outer surface thereof axially alined with the boss 12^c of plate 12 forming an inner bearing for the chain sprocket 13. It will be seen that when plates 11 and 12 are assembled, a rectangular shaped socket will be formed in the open end of plate 12 adapted to receive the rectangular shank 14^a of a vertical chainway 14. One of these chainways is disposed at each of the vertical sides of the wind shield extending perpendicular to the surface of the wind shield, and the entire mountings M and M' may be readily secured to the wind shield frame or the forward posts of the automobile body, as the case may be, by means of angle brackets 15 having slotted outwardly projected portions 15^a adapted to receive bolts 15^b. Bolts 15^b not only secure the mountings to the wind shield but moreover pass through alined eyes in plates 11 and 12 securing said plates together and clamping the shanks 14^a therebetween. Chainways 14 are each provided with a pair of spaced vertical grooves 14^b through which the endless chain may pass. A sprocket 13 is disposed in each of the sprocket housings formed by plates 11 and 12, rigidly secured to a suitable stub shaft 13^a, said shaft being journaled at its ends in bearings 11^c and 12^c. Sprockets 13 are of such diameter that the grooves 14^b of the chainways will extend in lines tangent to the opposite sides thereof, and endless chains 23 of suitable structure and size pass through said chainways and about said sprockets.

A driving head is carried at the upper end of mounting M' comprising a recessed housing member 16, co-operating with a suitable cap or bonnet 17 disposed on the outward side thereof and with one of the interchangeable inner bearing plates 11 on the inner side thereof. Member 16 is provided with a central cylindrical recess adapted to house one of the chain sprockets 13. Cap 17 has an internal boss 17^a forming an outer bearing for the end of a shaft 19 to which sprocket 13 and a worm gear 18 are rigidly secured, said worm gear being disposed within cap 17. Plate 11 co-operates with the inner side of member 16 to define the upper portion of the chainway for the driving head and also furnishes the inner bearing 11^c for the inner end of shaft 19.

Cap 17, (see Figs. 3 and 8) is provided with a pair of diametrically extended cylindrical ports internally threaded adjacent their outer ends through either of which a shaft 20 of a worm 20^a may pass to mesh with worm gear 18. Worm shaft 20 is driven by a small motor X, which may be mounted on the wind shield frame or top of the motor vehicle and may be connected to the shaft of said motor by means of a flexible tubular connection 21, telescoped over the ends of said shafts. Cap 17 may be secured to an outwardly extending flange on the driving head 16 in any desired position by means of suitable set screws and great adjustability is thereby provided for the disposition of the motor. The motor shaft may extend through either of ports 17^b and may be mounted in a plurality of different positions for connection with the worm shaft 20. As illustrated, the motor is mounted on the inner side of the wind shield frame at the top thereof, the motor shaft extending substantially horizontally through the frame and through one of the ports 17^b to connect with the driving worm.

The upper sprockets 13 of the mountings M and M' are connected for driving by means of the tubular shaft 22 telescoped over the inwardly projecting ends of shafts 13^a and 19. It will be noticed (see Fig. 2) that the ends of said shafts project a considerable distance beyond their respective bearings 11^c. The ends of tubular shaft 22 may be secured to shafts 13^a and 19 by means of suitable cotter pins or set screws. Thus the sprockets 13 at the upper ends of mountings M and M' are driven in unison by the motor and are vertically alined with the lower sprockets of the mountings. Endless chains of suitable noiseless type are trained over two sets of sprockets passing through the grooves 14^b of the chainways.

As illustrated, a pair of horizontally disposed wipers are connected across chains 23. These wipers may comprise elongated clamping rods 24 having inwardly disposed lips 24^a, said rods being slotted at their ends to engage oppositely disposed tongues 23^a integrally carried by four of the inner links of the chains 23, and are secured to the ends of the wiper holder 24 by means of diametrically disposed pins or bolts. Wiper strips 25 are clamped between the lips 24^a and are of suitable width to cause their outer longitudinal edges to engage the outer surface of the wind shield when the portions of the chains to which said wipers are secured move along the inner vertical grooves 14^b adjacent to the wind shield.

Cap 17 may be partially filled with lubricant and a vertically disposed disc or washer 26 may be disposed between said cap and driving head 16, serving to enclose the lubricating chamber.

The operation of my device is probably obvious from the foregoing description but may be briefly summarized as follows:

The sprockets 13 at the upper ends of mountings M and M' are driven in unison by the motor X and in the proper direction to cause chains 23 to move downwardly adjacent the outer surface of the wind shield. Thus the wiper strips 25 successively engage the top of the windshield sweeping the wind shield vertically from top to bottom, breaking the engagement with the wind shield at the bottom thereof and being carried upwardly in alinement with the outer vertical slots 14$^b$ of the chainways. I prefer to employ two wipers disposed diametrically opposite on endless chains 23 whereby the top of the wind shield will be almost simultaneously engaged by the second wiper at the time the stroke or sweep of the first wiper is completed. The height of most wind shields is relatively small compared to its width and it will be seen that in my device there will be little opportunity for the rain or snow to collect between the strokes.

It will be seen that moisture and dirt are swept downwardly and positively removed from the wind shield, since the wiper does not reverse but moves continuously in one direction.

My chainways, sprocket housings and bearing plates are interchangeable enabling the device to be manufactured at comparatively low cost, and it will be seen that the lengths of the chainways 14 may be varied as required without interfering with the other structure of the device. Likewise the mountings M and M' may be attached in vertical position to any wind shield and wipers and shaft 22 of suitable length supplied to meet all requirements. As shown in the drawings, the motor X is mounted within the interior of the motor vehicle attached to the upper portion of the wind shield frame. However, with my driving head and connections the motor may be attached in any required position and driving engagement made either from above or below the worm gear 18. The port in cap 17 not used is plugged.

I prefer to employ a prime mover or motor of constant rotary speed, whereby the frequency of the wiper strokes will be constant regardless of the speed of the automobile engine.

From the foregoing description it will be seen that I have invented a comparatively simple but highly efficient wind shield cleaner overcoming the objections to most wind shield wipers commercially sold at this time and adapted for universal application to all transportation vehicles.

It will, of course, be understood that various changes may be made in the form, details, arrangement and proportions of the parts without departing from the scope of the invention.

What is claimed is:

1. In a wind shield cleaner, a pair of vertically disposed mountings adapted to be secured adjacent the side edges of a wind shield and extending at right angles to the surface of said wind shield, each of said mountings comprising an upper and a lower sprocket housing and a chainway having its ends secured to said sprocket housings, each of said housings comprising two co-operating members defining a sprocket recess therebetween and provided with oppositely disposed horizontal bearings and said chainways each comprising a vertically disposed member having a pair of vertical grooves therein communicating with the recesses within said housings, sprockets rotatably mounted in said housings, an endless chain in each of said mountings trained over the upper and lower sprockets therein and passing through said grooves, a horizontal shaft rigidly connecting a pair of oppositely disposed sprockets of said mountings and a horizontal wiper secured between said chains.

2. In a wind shield cleaner, a pair of vertically disposed mountings adapted to be secured adjacent the side edges of a wind shield extending at right angles to the surface of said wind shield, each of said mountings comprising an upper and a lower sprocket housing and a chainway having its ends connected to said sprocket housings, each of said sprocket housings comprising a pair of co-operating clamping members defining a sprocket recess therebetween and having oppositely disposed horizontal bearings, said chainways having shanks at each end adapted to be clamped between said co-operating members and said sprocket housings, sprockets rotatably mounted in said housings, an endless chain in each of said mountings trained over the upper and lower sprocket thereof and passing through said chainway, a horizontal shaft rigidly connecting a pair of oppositely disposed sprockets in said mountings, a horizontal wiper secured between said chains, and means for driving one of said last mentioned sprockets.

3. In a wind shield cleaner adapted for universal application, a pair of vertically disposed mountings adapted to be secured adjacent the side edges of a wind shield, and extending at right angles to the surface of said wind shield, each of said mountings comprising an upper and a lower sprocket housing and a chainway having its ends detachably connected to said sprocket housing, each of said sprocket housings comprising a pair of co-operating clamping members defining a circular sprocket recess therebetween and having oppositely disposed horizontal bearings, said members also defining a shank receiving recess at one end of said housing, said chainways each having shanks at their ends adapted to be disposed in said shank recesses of said housings and each having a pair of vertical grooves communicating with the sprocket recesses of said housings, sprockets rotatably mounted in said housings, an endless chain in each of said mountings trained over the sprockets therein and passing through said chainway, a horizontal shaft detachably connecting a pair of corresponding sprockets in said mountings for driving in unison, a horizontal wiper secured between said chains and movable therewith, means for driving a sprocket connected with said shaft, and means for securing the members of said sprocket housings together.

In testimony whereof I affix my signature.

GUS R. SCOTT.